Jan. 23, 1962  R. M. TILLMAN  3,018,172
ALUMINUM-CONTAINING ADDITIVE FOR FUEL OIL COMPOSITIONS
AND METHOD OF PREPARING THE SAME
Filed May 13, 1957  4 Sheets-Sheet 1

INVENTOR.
Richard M. Tillman
BY Floyd Trimble
ATTORNEY

Jan. 23, 1962  R. M. TILLMAN  3,018,172
ALUMINUM-CONTAINING ADDITIVE FOR FUEL OIL COMPOSITIONS
AND METHOD OF PREPARING THE SAME
Filed May 13, 1957  4 Sheets-Sheet 2
DESCALED SPECIMENS AFTER AN EXPOSURE OF 50 HOURS TO COMBUSTION PRODUCTS OF HIGH SODIUM FUEL AT 1600° F.
UPSTREAM FACE
21
22
23
*FIG. 4*
DOWNSTREAM FACE
21
22
23
*FIG. 5*
INVENTOR.
RICHARD M. TILLMAN
BY Floyd Trimble
ATTORNEY

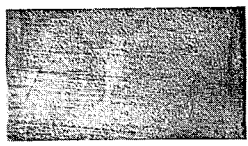
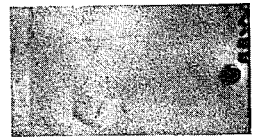
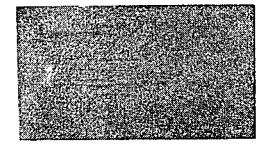
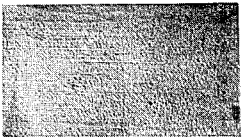
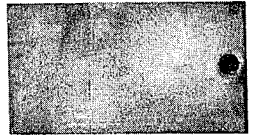
FIG. 6 — UPSTREAM FACE
FIG. 7 — DOWNSTREAM FACE
DESCALED SPECIMENS AFTER AN EXPOSURE OF 50 HOURS TO COMBUSTION PRODUCTS OF HIGH SODIUM FUEL AND ADDITIVE.
INVENTOR.
RICHARD M. TILLMAN
BY Floyd Trimble
ATTORNEY Jan. 23, 1962 R. M. TILLMAN 3,018,172
ALUMINUM-CONTAINING ADDITIVE FOR FUEL OIL COMPOSITIONS
AND METHOD OF PREPARING THE SAME
Filed May 13, 1957 4 Sheets-Sheet 4

DEPOSIT FORMED AFTER AN EXPOSURE OF 50 HOURS TO COMBUSTION PRODUCTS OF HIGH SODIUM FUEL AND ADDITIVE.

UPSTREAM FACE

DOWNSTREAM FACE

INVENTOR.
RICHARD M. TILLMAN
BY
Floyd Trimble
ATTORNEY

United States Patent Office 3,018,172
Patented Jan. 23, 1962

3,018,172
ALUMINUM-CONTAINING ADDITIVE FOR FUEL OIL COMPOSITIONS AND METHOD OF PREPARING THE SAME
Richard M. Tillman, Ponca City, Okla., assignor to Continental Oil Company, Ponca City, Okla., a corporation of Delaware
Filed May 13, 1957, Ser. No. 658,661
25 Claims. (Cl. 44—51)

This invention relates to hydrocarbon fuels containing sodium and/or vanadium compounds and more particularly to the treatment of such fuel compositions whereby the corrosion, normally caused when combustion products of fuel compositions containing either or both of these metals contact materials of construction at high temperatures, is inhibited. In addition, the invention relates to an aluminum-containing additive agent for hydrocarbon fuels containing sodium and/or vanadium compounds and to a method of preparing the same.

In recent years the tendency has been to operate gas turbine engines at higher and higher temperatures. At temperatures of 1200° F. and above, however, corrosion difficulties are often encountered because of the presence of sodium and vanadium compounds in the fuel. The mechanism of vanadium corrosion is not completely understood but is presumably associated with formation of vanadium pentoxide which has a melting point of approximately 1270° F. Liquid vanadium pentoxide is a powerful flux and readily attacks the protective oxide film on turbine metals, causing intense corrosion. In general, corrosion due to vanadium is proportional to the 12th power of the temperature in degrees F. over the range 1200 to 1600° F. Sodium in a fuel contributes both to deposits and to corrosion. It combines with sulfur oxides from sulfur in the fuel to form sodium sulfate, which sinters at low temperatures and adheres to turbine surfaces. Sodium corrosion generally occurs at temperatures of 1500° F. and above and is especially severe on nickel chromium alloys needed for operation at these temperature levels.

Although the gas turbine is gaining in popularity for use in industrial applications, such as pipe line pumping service, locomotives, electric power generation, and oil field repressurizing, it is competing with well-established power generators, namely the diesel engine and the steam turbine. In order for the gas turbine to complete economically with these established power generators, it must be able to consume the cheapest liquid fuels, to counterbalance the higher efficiency of the diesel, and to avoid fuels more expensive than those used for steam turbines. To meet these criteria, the gas turbine must be operable on a heavy residual fraction of crude oil, such as bunker C, which in many areas is the only economical fuel. Bunker C is noted for its variation in type and quantity of trace contaminants, the presence of which depends mainly on crude source and refinery processing. Two common contaminants present in bunker C fuel are vanadium and sodium compounds.

Several methods have been proposed as a general approach to making such residual fuels suitable for gas turbines. These have included:

(a) Selected fuels
(b) Operation at lower temperatures
(c) Removal of the corrosive agents
(d) Use of additives In special cases, fuels selected by crude source and refinery processing may be suitable, but such a solution would restrict availability of fuels.

Operating at lower temperatures minimizes corrosion; but, this is only accomplished at the sacrifice of power output.

Although the removal of sodium is definitely possible, the process is rather complicated and expensive to operate. On the other hand suitable processes for vanadium removal have not been developed. Refinery removal of sodium is not a cure-all, since the oil will be exposed to further contamination by sodium, particularly when shipped by tanker.

Of all the methods proposed for inhibiting corrosion, it appears that the use of additives presents the best approach. To inhibit the corrosion caused by such fuels, it has been proposed to add magnesium either as oil soluble or oil insoluble compounds. Whichever type is used, the results have not been entirely satisfactory. In order to impart oil solubility to the magnesium compound the organic radical must be large which limits the metal content of the compound. Since it is the metal that actually retards corrosion, it is obvious that a large amount of the compound must be used, making the process uneconomical. If an oil insoluble compound is used, it must be in the form of a slurry or as an emulsion in the fuel oil. Such slurries or emulsions are unstable, and for that reason the compound in order to obtain the best results must be added immediately prior to use.

It is, therefore, a principal object of the present invention to provide a fuel oil composition which obviates the disadvantages of the composition heretofore available. It is anther object of our invention to provide a fuel oil composition, particularly a fuel oil contaminated with vanadium and sodium compounds, which fuel has excellent performance characteristics with respect to freedom from corrosion. Yet another object of this invention is to provide fuel oil compositions that are non-corrosive and stable. It is still another object of this invention to provide an aluminum-containing additive agent for use in fuel oil compositions. A further object is to provide a process for preparing such aluminum-containing additive agents. These and other objects and advantages of this invention will become apparent as the description proceeds.

To the accomplishment of the foregoing and related ends, this invention comprises the features hereinafter fully described and particularly pointed out in the claims, the following description setting forth in detail certain illustrative embodiments of the invention. These are indicative, however, of but a few of the various ways in which the principle of the invention may be employed.

Briefly stated, the present invention comprises the addition to fuel oils, which normally cause corrosion to vital parts of turbine engines and other fuel consuming equipment because of the presence in the fuel oil of sodium and/or vanadium compounds, certain additives as corrosion inhibitors. These additives are prepared by adding an aluminum alkoxide dissolved or dispersed in an alkanol or other volatile solvent to a diluent mineral oil containing an oil soluble detergent. The aluminum hydroxide is then condensed in the mineral oil in a finely divided form by a hydrolysis reaction followed by removing volatile solvents.

Before proceeding with specific examples illustrating my invention, it may be well to indicate in general the nature of the materials required in the process.

Although any of the aluminum compounds dispersed in an oleaginous carrier and prepared in accordance with the disclosures of the following U.S. patents, Nos. 2,225,197; 2,469,041; 2,575,003; 2,585,520; 2,615,904; 2,626,207; 2,739,049; 2,744,074; or 2,781,341, may be used in my invention. I prefer the use of metal compositions prepared in accordance with the disclosure of my copending application Serial No. 657,035, filed May 6, 1957, and now abandoned, which application is entitled "Aluminum Containing Organic Compositions and Method of Preparing Same." The method as disclosed in my co-pending application is preferred for three reasons: first, a much higher concentration of aluminum in the additive may be produced; second, when these methods are followed, the diameters of the individual particles of the metal compound dispersed in the diluent mineral oil are less than 1 micron, generally less than 0.25 micron, and third, the dispersions so produced are stable.

A stable, finely divided dispersion of aluminum hydroxide in lubricating oil compositions following the preferred procedure may be prepared by:

(a) Forming a solution of aluminum alkoxide in a hydrocarbon solvent wherein the alkoxide radical is derived from an alkanol containing from 1 to 8 carbon atoms (b) Admixing the aluminum alkoxide solution with a mixture containing an oleaginous liquid vehicle, an oil soluble dispersing agent, and a quantity of water in excess of that required for the hydrolysis of said aluminum alkoxide whereby a uniform mixture is obtained.

(c) Condensing from said uniform mixture oil insoluble aluminum hydroxide in particles the diameter of which are less than 0.25 micron by heating said mixture whereby said alkoxide is completely hydrolyzed and volatile solvents and water are removed As pointed out in my co-pending application, the type of compounds suitable for use in the preparation of the aluminum hydroxide dispersion in lubricating oil may be described as follows:

ALUMINUM

The aluminum used in the process may be in the form of bars, rods, turnings, or pellets.

ALCOHOLS

The alcohols which may be used in the process of my invention include any alcohol that reacts readily with aluminum and is volatile. Suitable alcohols are aliphatic alcohols containing from 1 to 8 carbon atoms, and of these alcohols it was found that the primary alcohols were more reactive with aluminum than the secondary alcohols or tertiary alcohols. Of the normal straight-chain alcohols investigated, as a rule, it was found that the reactivity of the normal straight-chain alcohols increased with an increase in boiling point. Unfortunately, however, the solubility in common hydrocarbon solvents of the aluminum alkoxide prepared from normal primary alcohols was not appreciable. It was also found that the reactivity of primary branched chain alcohols was comparable to primary normal alcohols of similar boiling point; and in addition, the solubility in common organic solvents was vastly improved. All of the alcohols used required addition of a small quantity of mercuric chloride to initiate the reaction except for the 2-ethyl butyl and 2-ethyl hexyl alcohols. These alcohols, however, also required initiation unless the aluminum surface was thoroughly cleaned. The alcohols used are listed below in order of their increasing reactivity.

| | B.P., °C. |
|---|---|
| (1) Isopropyl alcohol | 82.5 |
| (2) Tertiary butyl alcohol | 82.9 |
| (3) Secondary butyl alcohol | 99.5 |
| (4) Methyl alcohol | 64.7 |
| (5) n-propyl alcohol | 98 |
| (6) n-butyl alcohol | 117 |
| (7) Isobutyl alcohol | 107 |
| (8) n-Amyl alcohol | 138 |
| (9) n-Hexyl alcohol | 157 |
| (10) 2-ethyl butyl alcohol | 149 |
| (11) 2-ethyl hexyl alcohol | 184 |

The two most promising alcohols from the foregoing list, considering both reactivity and solubility of the alkoxide, were isobutyl and 2-ethyl butyl alcohol. Of these two alcohols I prefer isobutyl alcohol because it is somewhat lower in cost and because of the lower processing temperature required for the removal of the isobutyl alcohol.

HYDROCARBON SOLVENT

Suitable hydrocarbon solvents when required include volatile petroleum distillates and oleaginous liquids such as pale oil.

When aluminum alkoxides are formed using a mixture of alcohols in excess, a hydrocarbon solvent is not required to produce a solution of the aluminum alkoxide. When this procedure is followed, I prefer to use a mixture of isobutyl and isopropyl alcohols or isobutyl and n-propyl alcohols.

OLEAGINOUS LIQUID VEHICLE

Oleaginous carriers which may be used include mineral lubricating oil obtained by any of the conventional refining procedures, vegetable oils such as corn oil, cottonseed oil, castor oil, etc., animal oils such as lard oil, sperm oil, etc., and synthetic oils. Synthetic oils include polymers of propylene, polyoxyalklenes such as polyoxypropylene and esters of polyoxypropylene, dicarboxylic acid esters such as esters of adipic and azelaic acids with alcohols such as butyl, 2-ethyl hexyl and dodecyl alcohols, and esters of acids of phosphorus such as diethyl ester of decanephosphonic acid and tricresyl phosphate. If desired, the oleaginous carriers may be diluted with a solvent to reduce the viscosity. Suitable solvents include petroleum naphtha or hydrocarbons such as hexane, heptane, octane, benzene, toluene, or xylene.

OIL SOLUBLE DISPERSING AGENT

A variety of oil-soluble dispersing agents may be used. Suitable dispersing agents include both anionic and non-ionic forms. The sulfonates, organic phosphorus compounds, phosphorus sulfide treated olefins, and metal soaps of carboxylic acids are typical ionic dispersing agents.

SULFONATES

Sulfonates which are suitable are oil-soluble and include alkyl sulfonates, alkaryl sulfonates, the so-called mahogany or petroleum soaps, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include non-aromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, howevre, require an alkyl portion totalling only about 18 carbon atoms. To attain the requisite oil solubility, therefore, requires that the hydrocarbon portion of the sulfonate have a molecular weight between about 350 and 1,000. Preferably this molecular weight is between 400 and 700. Particularly useful sulfonates include diwaxbenzene sulfonates, diwaxtoluene sulfonates, and polydodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24. As the melting point of the wax decreases the carbon content of the mixture will average as low as 18 or a little lower.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dicetyl thianthrene sulfonates, dilauryl beta-naphthol sulfonates, dicapryl nitronaphthalene sulfonates, unsaturated paraffin wax sulfonates, hydroxy substituted paraffin wax sulfonates, tetraamylene sulfonates, mono- and poly-chlorosubstituted paraffin wax substituted cyclohexyl sulfonates, and the like. The expression "petroleum sulfonate" is intended to cover all sulfonates derived from petroleum products. Of the different sulfonic acids which may be used, I prefer postdodecylbenzene sulfonic acid and dinonyl naphthalene sulfonic acid.

Instead of using the foregoing sulfonates as such in the invention, I may also form those sulfonates in situ by adding the corresponding sulfonic acid to the mixture which then can be converted to the sulfonate by any convenient means. Generally, for convenience, such a modification is preferred. When this modified procedure is followed, I add from about 1½ to 6 times the quantity of the aluminum compound that will react with sulfonic acid thus insuring the presence of an aluminum compound in the product as a dispersoid.

PHENOLIC COMPOUNDS

The phenolic organic compounds which may be used are the free oil-soluble phenolic compounds or the metal phenates thereof. Oil-solubility is imparted to such phenolic compounds by the presence in the molecule of at least nine aliphatic carbon atoms. Specific examples are: 3,5,5-trimethyl-n-hexyl phenol, n-decyl phenols, cetyl phenols, nonyl phenols, and the like; alkaryl substituted phenols such as alkyl-phenyl phenols; polyhydroxy alkyl-aromatic compounds such as 20-carbon alkyl resorcinol, or poly-hydroxy alkyl-benzenes, such as, for example, octyl catechol, triiso-butyl pyrogallol, and the like; mono-hydroxy alkyl-naphthalenes such as 12-carbon alkyl alpha naphthol, and the like. Alkyl substituted phenol sulfides containing at least 5-alkyl carbon atoms such as iso amyl or nonyl phenol disulfide and the like may be used. Dinonyl phenol and nonyl phenol disulfide have been found to be preferred materials.

ORGANIC PHOSPHORUS COMPOUNDS

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, phosphonic acids, and thiophosphonic acids, and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, mono-wax phosphorus acids, monooctadecyl phosphorus acid, monododecyl phosphorus acid, methyl cyclohexyl phosphite, capryl phosphite, dicapryl phosphite, zinc mono-waxbenzene phosphonate, zinc dodecylbenzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(iso-propyl-phenyl) monothiophosphoric acids, and the like, and the oil-soluble salts thereof.

PHOSPHORUS SULFIDE TREATED OLEFINS

The phosphorus sulfide treated olefins and their oil-soluble metal salts which are suitable for use include those customarily used in lubricating oil formulations as corrosion inhibitors and/or detergents. Specifically, they include the potassium-polyisobutylene-phosphorus sulfide products described by U.S. Patent No. 2,316,080, issued on April 6, 1943, to Loane and Gaynor and a similar material contining no metal made by addition of a phosphorus sulfide to wax olefins as described in U.S. Patent No. 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

METAL SOAPS OF CARBOXYLIC ACIDS

Examples of specific soaps which are preferred for use because of cost and availability include metal soaps of naphthenic acids, rosin acids, mixtures of rosin acids and higher fatty acids (tall oil fatty acids) and the higher fatty acids.

Suitable naphthenic acid radicals include substituted cyclopentane mono- and di-carboxylic acids and cyclohexane mono- and di-carboxylic acids having at least about 15 carbon atoms for oil solubility, for example, cetyl cyclohexane carboxylic acids, dioctyl cyclopentane carboxylic acids; and dilauryl deca-hydro-naphthalene carboxylic acids, and the like, and oil-soluble salts thereof.

Suitable oil-soluble fatty acid radicals include those in which there are present at least about 8 carbon atoms. The metal salts of the unsaturated and branched chain acids being oil-soluble with fewer aliphatic carbon atoms than the saturated acids. Specific examples are: 2-ethyl hexoic acid, linoleic acid, and the like. Naturally occurring mixtures of rosin acids and predominantly unsaturated fatty acids such as tall oils are particularly suitable. Substituted fatty acids which are useful may include chlorostearic acids, ricinoleic acids, and the like.

Similarly as in the case of the sulfonates, I may, instead of using the foregoing carboxylic acid soap as such in the invention form those soaps in situ by adding the corresponding carboxylic acid to the mixture which then can be converted to the soap by any convenient means. When this latter procedure is followed, we add from about 1½ to 6 times the quantity of the aluminum compound that will react with the carboxylic acid thus insuring the presence of an aluminum compound in the product as a dispersoid.

NONIONIC OIL-SOLUBLE SURFACE ACTIVE AGENTS

Suitable nonionic oil-soluble surface active agents for use in the process of my invention include: polyethylene glycol oleate, obtainable under the trade name "Antarox B–100"; polyoxyethylene lauryl alcohol, obtainable under the trade name "Brij–30"; a condensation product of a polyglycol, fatty acid, and sodium sulfosuccinate acid obtainable under the trade name "D-Spers-O, W. PS, MO, CL"; a lanolin derivative obtainable under the trade name "G–1493"; a long chain fatty ester containing multiple ether linkages obtainable under the trade name "Mulsor"; a fatty amino compound obtainable under the trade name "Nopco 1219–A"; an alkylated aryl polyether alcohol obtainable under the trade name "Triton X–45"; and a dimeric alkylated aryl polyether alcohol obtainable under the trade name "Triton X–155."

CATIONIC OIL-SOLUBLE SURFACE ACTIVE AGENTS

Suitable cationic oil-soluble surface active agents for use in the process of my invention include: a substituted oxazoline, obtainable under the trade name "Alkaterge C, A, E, T"; heterocyclic tertiary amine

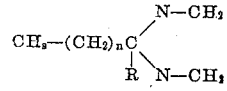

obtainable under the trade name "Alro amines, C, O, S"; a secondary fatty acid amine, obtainable under the trade name "Armeen 2C, 2HT"; quaternary ammonium compounds of the formula RR'—N—(CH$_3$)$_2$Cl, obtainable under the trade name "Arquad 2C, 2HT"; and a modified cationic agent, obtainable under the trade name "Detergent I-160."

The invention will now be more fully described with reference to specific examples and to the accompanying drawings, of which:

FIGURE 4 is a photograph of the up-stream face of de-scaled test panels after exposure to the combustion products of a high sodium content fuel.

FIGURE 5 is a photograph of the down-stream face of de-scaled test panels after exposure to the combustion products of a high sodium content fuel.

FIGURE 6 is a photograph of the up-stream face of de-scaled test panels after exposure to the combustion products of a high sodium content fuel to which my aluminum containing additive had been added.

FIGURE 7 is a photograph of the down-stream face of de-scaled test panels after exposure to the combustion products of a high sodium content fuel to which my aluminum containing additive had been added.

Figure 1:
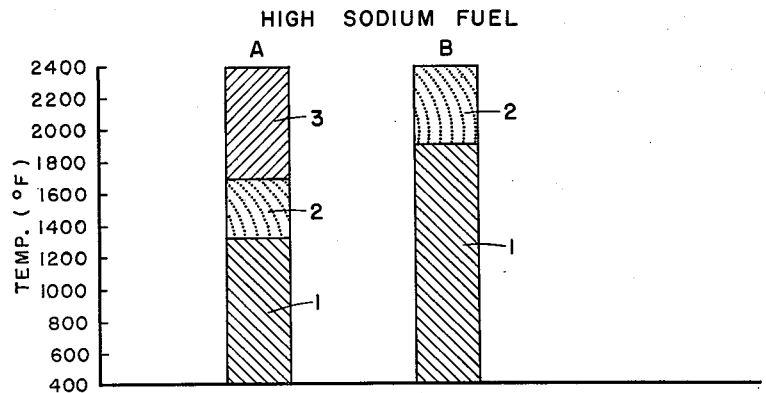
FIGURE 1 is a graph showing the condition at different temperatures of the ash obtained on burning a high sodium content fuel.

In order to disclose the nature of the present invention still more clearly, the following illustrative examples will be given. It is to be understood that the invention is not to be limited to the specific conditions or details set forth in these examples except insofar as such limitations are specified in the appended claims. Parts given, unless otherwise stated, are parts by weight.

*Example 1*

A vessel equipped with a reflux condenser was charged with 296 parts of isobutyl alcohol and 27 parts of aluminum ingots. Only 222 parts of isobutyl alcohol is required to react with the 27 parts of aluminum, the excess being used to insure high reaction rate and act as a solvent. A super-saturated solution of mercuric chloride in isobutyl alcohol, approximately 8 percent by weight of mercuric chloride at 24° C., equal to .01 solid percent of the total alcohol charged, was then added. I have found that this quantiy of mercuric chloride is sufficient to catalyze the reaction without significantly contaminating the final product. The reaction proceeded at reflux temperature; and after a period of several hours, the reaction was complete. At the conclusion of the reaction the contents of the reaction vessel are dark colored and very viscous, even at reflux temperature. The alkoxide itself in the absence of excess alcohol is a solid below 200° C. The reaction mass is then diluted with an equal volume of xylene, and then filtered in the presence of a flocculating agent to remove the colloidal metal particles originally present in the aluminum as dissolved impurities. Suitable flocculating agents have been found to include diatomaceous earth and attapulgus clay. The solution of aluminum isobutoxide, excess isobutanol, and xylene may then be used directly in the process of this invention. I have also found that xylene can be advantageously added at the start of the reaction and thus overcome the disadvantage of handling a viscous product. The aluminum content of the undiluted aluminum isobutoxide is 10.98 percent, whereas I normally dilute with xylene to a product containing around 5 percent aluminum.

*Example 2*

A vessel equipped with an agitator and a condenser set for distillation was charged with 38.10 parts of postdodecylbenzene sulfonic acid (.526 meq./g. sulfonic acidity), 11.67 parts of 170 S.S.U. pale oil at 100° F., and 5 parts of water. There was then added slowly 23 parts of the aluminum alkoxide solution in xylene containing 5 percent Al prepared as in Example 1 to the reaction vessel over a 30-minute period. Immediately after all the aluminum alkoxide had been added, the volatile solvents were removed from the reaction vessel by heating to a temperature of 150° C. The product was then blown with nitrogen to facilitate the removal of residual solvents. Any inert gas may be used for blowing, such as carbon dioxide, natural gas, or even flue gases. The resulting product was bright, oil soluble, and analyzed 4.51 percent aluminum.

I have found that the amount of water used is relatively noncritical. Generally, to insure complete decomposition of alkoxides and the regeneration of the alcohol, a quantity of water equal to twice the theoretical amount is used.

Postdodecylbenzene sulfonic acid is the acid produced by sulfonating postdodecylbenzene. Postdodecylbenzenes consists of monoalkylbenzenes and dialkylbenzenes in the approximate ratio of 2:3. Its typical physical properties are as follows.

| | |
|---|---|
| Specific gravity at 38° C | 0.8649 |
| Average molecular weight | 385 |
| Percent sulfonatable | 88 |
| A.S.T.M., D-158 Engler, ° F.: | |
| I.B.P | 647 |
| 5 | 682 |
| 50 | 715 |
| 90 | 760 |
| 95 | 775 |
| F.B.P | 779 |
| Refractive index at 23° C | 1.4900 |
| Viscosity at: | |
| −10° C centipoises | 2800 |
| 20° C do | 280 |
| 40° C do | 78 |
| 80° C do | 18 |
| Aniline point ° C | 69 |
| Pour point ° F | −25 |

*Example 3*

The procedure of Example 2 was followed with the following changes. The charge consisted of 40 parts dinonyl naphthalene sulfonic acid
24 parts 170 SSU at 100° F. pale oil
10 parts water
50 parts light naphtha These ingredients were placed in a 3-neck flask equipped with a reflux condenser, stirrer, dropping funnel, and heating mantle. The flask contents were agitated and the temperature raised to 50° C. At this point the following solution was added over a 15-minute interval: 49 parts aluminum isobutoxide solution containing 4.9 percent aluminum in hexane.

Upon completion of the aluminum isobutoxide addition, the reflux condenser was changed for a distillation condenser and the volatile solvents and water removed by distillation. The end distillation temperature was 150° C. This preparation yielded 68.5 parts of a bright liquid of medium viscosity containing 3.5 percent aluminum.

*Example 4*

The procedure of Example 2 was again followed with the following changes. In this example the charge consisted of 60.0 parts Crofatol O refined tall oil
23.1 parts 170 SSU at 100° F. pale oil
120 parts xylene
30 parts water This preparation was made in the same manner as Example 2. To the above mixture was added 175 parts aluminum isobutoxide solution containing 5.25 percent aluminum in xylene.

The flask contents were then distilled to a temperature of 150° C. where a medium viscosity bright liquid containing 7½ percent aluminum was obtained. This concentrated aluminum dispersion was then diluted while still hot with 50 parts dodecylbenzene intermediate to yield 147.6 parts of product containing 5.1 percent aluminum. The diluted product was light colored and clear and was a mobile liquid at 24° C.

*Example 5*

The procedure of Example 2 was followed with the exception that a commercially available aluminum isopropoxide was used instead of the product prepared in accordance to Example 1. The final product obtained was similar to the final product of Example 2.

*Example 6*

The procedure of Example 2 was followed with the exception that a natural sulfonic acid analyzing as follows:

|   | Percent |
|---|---|
| Mineral oil | 28 |
| Sulfonic acid | 56.5 |
| Sulfuric acid | 6 |
| Water | 9.5 | wherein the average molecular weight of the sulfonic acid was equal to 495 was substituted for the postdodecylbenzene sulfonic acid. The substitution, of course, was on a molar basis. The final product obtained was similar to the final product obtained in Example 2.

Typical properties of the product Crofatol O are as follows:

| | |
|---|---|
| Percent rosin acids | 20 |
| Percent fatty acids | 58 |
| Percent unsaponifiables | 22 |
| Acid number | 136 |
| Saponification number | 142 |
| Iodine value | 180 |
| Titre °C | 10 |
| Gardner viscosity | A |
| Gardner color | 12 |
| Weight per gallon pounds | 7.9 |
| Flash point ° F | 345 |

*Example 7*

The procedure of Example 2 was again followed with the following changes. In this example the charge consisted of 65 parts Crofatol 5 tall oil fatty acid
108 parts pale oil 170 SSU at 100° F.
50 parts xylene
178.5 parts Al isobutoxide solvent in xylene containing 5.6 percent aluminum
25 parts water This preparation yielded 192 parts of light colored, transparent, fluid product containing 5.2 percent aluminum.

The Crofatol 5 used in this example was a tall oil fatty acid having the following properties:

| | |
|---|---|
| Acid number | 190 |
| Saponification number | 192 |
| Iodine number | 130 |
| Percent unsaponifiable | 4.0 |
| Percent rosin acids | 6.0 |
| Percent fatty acids, total | 90 |
| Percent saturated fatty acids | 3 |
| Percent unsaturated fatty acids | 87 |
| Titre °C | 5 |

| | |
|---|---|
| Gardner color | 6-7 |
| Gardner viscosity | A |
| Weight per gallon pounds | 7.5 |
| Flash point °F | 380 |

*Example 8*

Ash fusion tests were conducted as described in "The Evaluation of Corrosion Resistance for Gas Turbine Blade Materials," by W. E. Young, A. E. Hershey, and C. E. Hussy, at the A.S.M.E. Annual Meeting, Gas Turbine Power Division, New York, New York, November 28 to December 3, 1954. In brief, this procedure may be described as involving ignition of the test fuel containing vanadium and/or sodium with and without corrosion control additives in an inert crucible. The resultant ash is then heated in a muffle furnace at 900 to 1100° F. until carbonaceous material is eliminated and constant weight achieved. The cooled ash is then placed in a furnace capable of being heated to very high temperatures wherein the ash may be continuously studied with a long working distance microscope. As the ash is heated, four stages of melting are observed; namely, (1) The temperature at which the granular ash begins to sinter
(2) The temperature at which the material becomes tacky and the first bubble appears on its surface
(3) The temperature at which initial melting occurs, accompanied by liquids starting to collect on the bottom of the crucible
(4) The temperature at which complete melting occurs It has been established that catastrophic attack occurs only when an alloy is exposed to the liquid phase of the ash derived from the combustion products of a corrosive oil. As a consequence, the sintering point and first bubble point are significant primarily in determining the deposit forming tendency of an ash rather than its corrosive nature. The initial and final melting points, on the other hand, indicate the temperature range wherein corrosion is likely to start.

Figure 2:
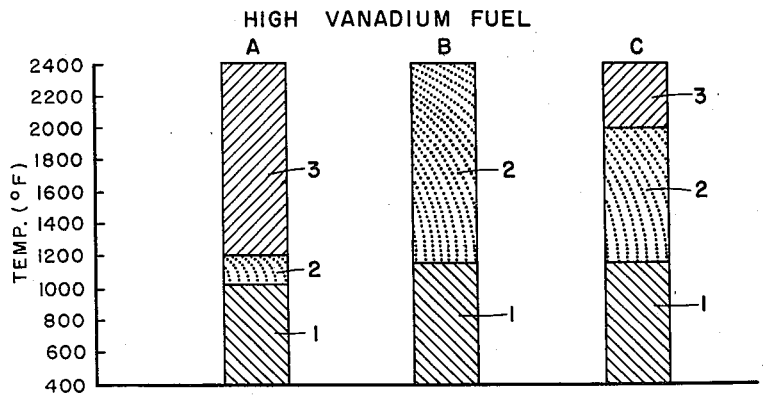
FIGURE 2 is a graph showing the condition at different temperatures of the ash obtained on burning a high vanadium content fuel.

The results of ash fusion tests are illustrated in FIGURES 1 and 2, in which the condition of the ash is plotted versus temperature. In FIGURE 1, column A denotes the condition of the ash by burning a high sodium fuel (417 p.p.m. sodium plus 9 p.p.m. vanadium) and column B denotes the condition of the ash obtained on burning the same fuel containing my aluminum containing additive at different temperatures. The amount of additive used was sufficient to give an aluminum-sodium ratio of 2:1 in the fuel composition. Area 1 denotes the temperature range through which the ash remains solid and granular. Area 2 denotes the temperature range through which the ash begins to sinter. Area 3 denotes the temperature range through which complete melting occurs.

As shown graphically in FIGURE 1 the addition of my aluminum containing additive has a marked effect on the fusion temperature of the ash derived from the high sodium content fuel, (417 p.p.m. sodium and 9 p.p.m. vanadium). When no additive is used in such a fuel, the sintering temperature is well below desirable turbine operating temperatures. As is apparent from the graph, column A, the sintering point of the ash is about 1300° F. When my aluminum containing additive is incorporated in such a fuel, the sintering point of the ash is raised about 600° F. to about 1900° F., well above normal turbine operating temperature.

The addition of my aluminum containing compound to a high vanadium content fuel (375 p.p.m. vanadium) also has a marked effect on the ash derived from such a fuel as is shown in FIGURE 2. In FIGURE 2, column A denotes the condition of the ash containing no additive; column B the condition of the ash containing my aluminum containing additive; and column C the condition of the ash containing a magnesium oxide additive.

Magnesium oxide containing compositions have been described in the prior art and the use of such compositions are reported here for comparison purposes. It should be noted that the amount of my aluminum containing compound used was sufficient to give an aluminum-vanadium ratio of 2:1 while the amount of magnesium oxide used to raise the sintering temperature to the same value gave a magnesium-vanadium ratio of 3.34:1. In FIGURE 2, the numerals 1, 2, and 3 have the same meaning as they had in FIGURE 1; namely, area 1 denotes the temperature range through which the ash remains solid and granular, area 2 denotes the temperature range through which the ash begins to sinter and, area 3 denotes the temperature range through which complete melting occurs.

Although the sintering point of the ash containing my additive was below desirable turbine operating temperatures, the melting point was well above. Experience has shown that corrosion due to the presence of a vanadium impurity only is not serious below the melting point of the ash. When no additive was present, the ash was completely molten at about 1200° F.

*Example 9*

SHORT TERM COMBUSTION RIG TEST

Figure 3:
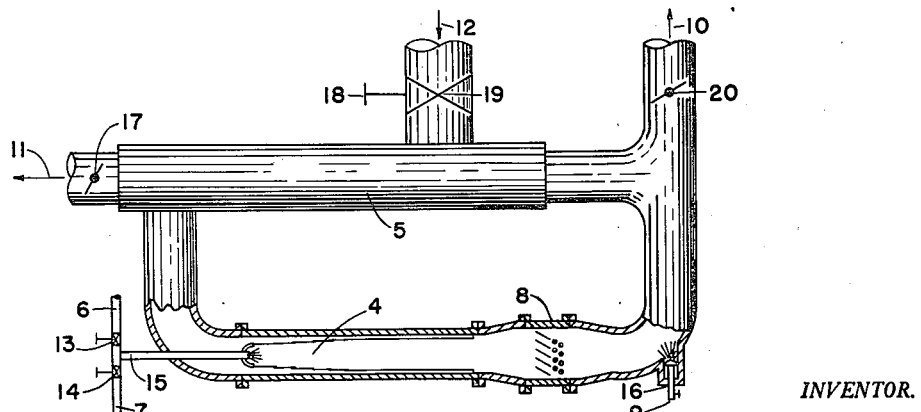
FIGURE 3 shows the experimental equipment, partially in section, used in running the corrosion tests.

This test employed a single combustor similar in size and design to those used in commercial 1800 H.P. gas turbines. This combustor is illustrated schematically in FIGURE 3 in which the numeral 4 denotes the combustor chamber. Other portions of the combustor apparatus are identified as follows: 5, heat exchanger; 6, diesel fuel inlet; 7, test fuel inlet; 8, test panels; 9, cooling water inlet; 10, exhaust gas outlet; 11, exhaust gas outlet; 12, air inlet; 13, valve to control flow of diesel fuel; 13, valve to control flow of test fuel; 15, fuel line to combustion chamber; 16, pipe to conduct cooling water; 17, damper to control gas outlet; 18 and 19, lever and damper to control air inlet respectively; and 20, damper to control exhaust gas outlet.

In operation of this apparatus, the startup is with a diesel fuel which is non-corrosive and then when the desired test temperature has been reached, a shift is made to the test fuel. This is accomplished by means of the control valves 13 and 14 identified above. The test fuel, with or without the additives, is burned in the combustor in an excess of air. The hot gases from the combustion chamber are directed into the test section containing test alloys which are small corrosion test coupons 2¼" x 1¼" x ⅛" in size, mounted at a 45° angle to the direction of gas flow. These test coupons are previously ground, lapped, and polished to a 2 microinch R.M.S. finish. The tendency towards corrosion is indicated in a very short period by an increase in surface roughness. Surface roughness is quantitatively measured using a Brush surface analyzer after electrolytic descaling to remove deposits.

Test conditions were two hours at 1600° F. The fuel used contained 375 p.p.m. vanadium and the aluminum containing compound was added to give an aluminum-vanadium ratio of 2:1. Test results indicated that there was an improvement using the additive in conjunction with 25/20 stainless steel. For example, at 1500° F. the attack amounted to a roughness increase of 5 microinches with the additive and when the additive was not used, the roughness increase was 15 microinches. Furthermore, the shape of the corrosion curve was quite striking. Without the additive it rose sharply with temperature but when the additive was present, the curve was nearly flat up to 1700° F. The weight loss also indicated protection. Without additive the weight loss was .265 percent and with the additive it was reduced to .002 percent.

*Example 10*

LONG TERM COMBUSTION RIG TEST

This test was very similar to the short term test described in Example 9; however, an actual combustor from a 2000 kw. gas turbine was used operating at atmospheric pressure. The duration of the test was sufficient to cause a major loss in weight of the coupon due to corrosive attack. This test is also very suitable for indicating deposit characteristics of the ash which occur in an actual turbine. In these tests a high sodium content fuel (417 p.p.m. sodium and 9 p.p.m. vanadium) was used. In all of these experiments the duration of the test was 50 hours and the temperature was approximately 1600° F. When the additive was added it was used in an amount sufficient to give aluminum-sodium ratio of 2:1.

Actual photographs of de-scaled test coupons are given in FIGURES 4 and 5. The only difference between FIGURES 4 and 5 is that FIGURE 4 represents the up-stream face of the coupons while FIGURE 5 shows the down-stream face. In the photographs 21 denotes stainless steel, 22 denotes Inconel X, and 23 denotes Stellite 23. As will be apparent from the photographs the coupons were badly corroded by the combustion products. Particularly the Inconel X which, in one spot, was completely eroded.

The test was then repeated using the same fuel to which my additive was added in the amount as stated above. FIGURES 6 and 7 are photographs of the de-scaled test coupons after being exposed under the same conditions of time and temperature as the coupons in FIGURES 4 and 5. FIGURES 6 and 7 are identical with the exception that FIGURE 6 is a photograph of the up-stream face of the coupon and FIGURE 7 is a photograph of the down-stream face of the coupons. In these photographs the coupons are identified as follows: 21, 25/20 stainless steel; 22, Inconel X; 24, Inconel X to which an aluminum coating had been applied; and 25, Stellite 31.

As will be apparent from the photographs the additive was very effective in protecting the surface of the metal. Of the different coupons used, it is apparent that the Inconel X plus the aluminum coating (coupon 24) was the most effective followed closely by the stainless steel coupons. It should be noted, however, that a great deal of protection was afforded to the Inconel X and Stellite 31 coupons. The aluminum coating may be applied to the Inconel X by methods which are well known to those skilled in the art. In general, these methods are the same as those used in applying aluminum coating to steel and for further description of such processes, reference is made to the journal, "Materials and Methods," volume 36, Number 5, December 1952, pages 105 to 108 and the literature cited therein.

Figure 8:
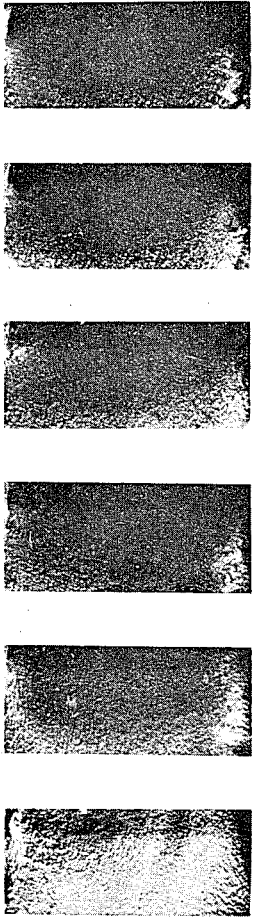
FIGURE 8 is a photograph of the up-stream face of the test panels showing the deposit formed following exposure to the combustion products of a high sodium content fuel containing my additive.
Figure 9:
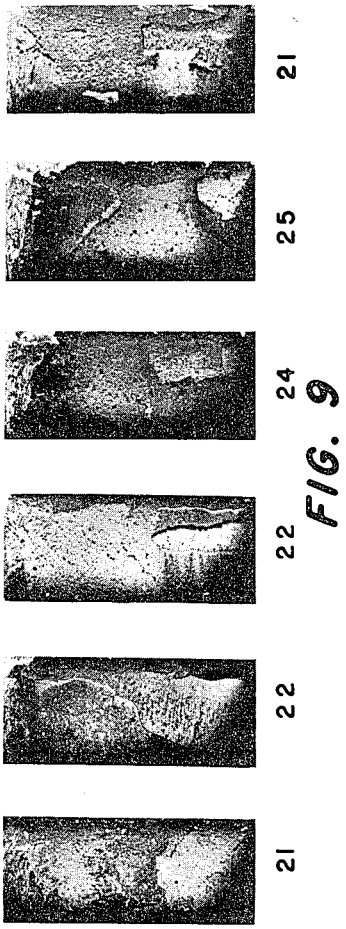
FIGURE 9 is a photograph of the down-stream face of the test panels showing the deposits formed following exposure to the combustion products of a high sodium content fuel containing my additive.

In FIGURES 8 and 9 are photographs of the test coupons after an exposure of 50 hours to combustion products of a high sodium fuel plus my additive. FIGURES 8 and 9 are identical with the exception that FIGURE 8 is a photograph of the up-stream face and FIGURE 9 is a photograph of the down-stream face. As in FIGURES 6 and 7, the stainless steel coupon is identified as 21, Inconel X as number 22, Inconel X plus aluminum coating as number 24, and Stellite 31 as number 25. This photograph was taken merely to show that the deposit formed from such a fuel containing such an additive was granular in form and produced a loosely adherent and rather uniform coating. When no additive is used the result is a scale-like deposit.

The aluminum containing additive used in the corrosion studies reported in Examples 8, 9, and 10 was the product of Example 2. Similar results were obtained when the aluminum containing additives prepared according to Examples 3 to 7 inclusive, were substituted for the product of Example 2. As to the amount of additive used that may be varied greatly. For example, satisfactory ash fusion results may be obtained when the quantity used is sufficient to provide an aluminum-sodium or aluminum-vanadium ratio of 0.5:1 in the fuel composition. Better results are obtained when the amount of additive used is somewhat greater than this. I obtain excellent results both in ash fusion tests and in combustor tests when the amount of additive used is sufficient to give an aluminum-sodium or aluminum-vanadium ratio of 2:1. Greater quantities of the additive, of course, may be used and, in fact, deposit characteristics are considerably improved at an aluminum-sodium ratio of 6:1. I generally prefer to use the lowest effective ratio because the use of greater quantities increases costs with diminishing benefit.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. A corrosion inhibitor adapted to be added to a fuel oil composition containing sodium and vanadium compounds, said corrosion inhibitor having been prepared by a process which consists essentially of:
   (a) forming a solution of aluminum alkoxide in a volatile hydrocarbon solvent wherein the alkoxide radical is derived from an alkanol containing from 1 to 8 carbon atoms;
   (b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;
   (c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained.

2. A corrosion inhibitor as defined in claim 1 wherein the oil-soluble dispersing agent is a metal alkaryl sulfonate.

3. A corrosion inhibitor as defined in claim 1 wherein the oil-soluble dispersing agent is an alkaryl sulfonic acid.

4. A corrosion inhibitor as defined in claim 1 wherein the oil-soluble dispersing agent is a metal soap of carboxylic acid.

5. A corrosion inhibitor as defined in claim 1 wherein the oil-soluble dispersing agent is a carboxylic acid containing at least 8 carbon atoms.

6. A corrosion inhibitor as defined in claim 1 wherein the volatile hydrocarbon solvent is xylene.

7. A corrosion inhibitor as defined in claim 1 wherein the volatile hydrocarbon solvent is a petroleum distillate.

8. The method of inhibiting corrosion of metal surfaces which are susceptible of corrosion when combustion products of a fuel oil composition containing sodium and vanadium compounds contact such metal surfaces at temperatures above 1200° F., which comprises incorporating in the said fuel oil composition a corrosion inhibitor wherein said corrosion inhibitor is prepared by a process which consists essentially of:
   (a) forming a solution of aluminum alkoxide in a volatile hydrocarbon solvent wherein the alkoxide radical is derived from an alkanol containing from 1 to 8 carbon atoms;
   (b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;
   (c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained.

9. The method of inhibiting corrosion of metal surfaces which are susceptible of corrosion when combustion products of a fuel oil composition containing sodium and vanadium compounds contact such metal surfaces at temperatures above 1200° F., which comprises incorporating in said fuel oil composition a corrosion inhibitor wherein said corrosion inhibitor is prepared by a process which consists essentially of:
   (a) forming a solution of aluminum alkoxide in a volatile hydrocarbon solvent wherein the alkoxide radical is derived from an alkanol containing from 1 to 8 carbon atoms;
   (b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;
   (c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained, and that the amount of said inhibitor added to said fuel oil composition is sufficient to give an aluminum-sodium and aluminum-vanadium ratio of at least 0.5:1.

10. The method of inhibiting corrosion of metal surfaces which are susceptible of corrosion when combustion products of a fuel oil composition containing sodium and vanadium compounds contact such metal surfaces at temperatures above 1200° F., which comprises incorporating in said fuel oil composition a corrosion inhibitor wherein said corrosion inhibitor is prepared by a process which consists essentially of:
   (a) forming a solution of aluminum alkoxide in a volatile hydrocarbon solvent wherein the alkoxide radical is derived from an alkanol containing from 1 to 8 carbon atoms;
   (b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained, and that the amount of said inhibitor added to said fuel oil composition is sufficient to give an aluminum-sodium and aluminum-vanadium ratio within the range of 0.5:1 to 2:1.

11. The method of inhibiting corrosion of metal surfaces which are susceptible of corrosion when combustion products of a fuel oil composition containing sodium compounds contact such metal surfaces at temperatures above 1200° F., which comprises incorporating in said fuel oil composition a corrosion inhibitor wherein said corrosion inhibitor is prepared by a process which consists essentially of:

(a) forming a solution of aluminum alkoxide in a volatile hydrocarbon solvent wherein the alkoxide radical is derived from an alkanol containing from 1 to 8 carbon atoms;

(b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained.

12. The method of inhibiting corrosion of metal surfaces which are susceptible of corrosion when combustion products of a fuel oil composition containing vanadium compounds contact such metal surfaces at temperatures above 1200° F., which comprises incorporating in said fuel oil composition a corrosion inhibitor wherein said corrosion inhibitor is prepared by a process which consists essentially of:

(a) forming a solution of aluminum alkoxide in a volatile hydrocarbon solvent wherein the alkoxide radical is derived from an alkanol containing from 1 to 8 carbon atoms;

(b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained.

13. The method of inhibiting corrosion of metal surfaces which are susceptible of corrosion when combustion products of a fuel oil composition containing sodium compounds contact such metal surfaces at temperatures above 1200° F., which comprises incorporating in said fuel oil composition a corrosion inhibitor where in said corrosion inhibitor is prepared by a process which consists essentially of:

(a) forming a solution of aluminum alkoxide in a volatile hydrocarbon solvent wherein the alkoxide radical is derived from an alkanol containing from 1 to 8 carbon atoms;

(b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained, and that the amount of said inhibitor added to said fuel oil composition is sufficient to give an aluminum-sodium ratio of at least 0.5:1.

14. The method of inhibiting corrosion of metal surfaces which are susceptible of corrosion when combustion products of a fuel oil composition containing vanadium compounds contact such metal surfaces at temperatures above 1200° F., which comprises incorporating in said fuel oil composition a corrosion inhibitor wherein said corrosion inhibitor is prepared by a process which consists essentially of:

(a) forming a solution of aluminum alkoxide in a volatile hydrocarbon solvent wherein the alkoxide radical is derived from an alkanol containing from 1 to 8 carbon atoms;

(b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained, and that the amount of said inhibitor added to said fuel oil composition is sufficient to give an aluminum-vanadium ratio of 0.5:1.

15. The method of inhibiting corrosion of metal surfaces which are susceptible of corrosion when combustion products of a fuel oil composition containing sodium contact such metal surfaces at temperatures above 1200° F., which comprises incorporating in said fuel oil composition a corrosion inhibitor wherein said corrosion inhibitor is prepared by a process which consists essentially of:

(a) forming a solution of aluminum alkoxide in a volatile hydrocarbon solvent wherein the alkoxide radical is derived from an alkanol containing from 1 to 8 carbon atoms;

(b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained, and that the amount of said inhibitor added to said fuel oil composition is sufficient to give an aluminum-sodium ratio within the range of 0.5:1 to 6:1.

16. A method of inhibiting corrosion of metal surfaces which are susceptible of corrosion when combustion products of a fuel oil composition containing vanadium compounds contact such metal surfaces at temperatures above 1200° F., which comprises incorporating in said fuel oil composition a corrosion inhibitor wherein said corrosion inhibitor is prepared by a process which consists essentially of:

(a) forming a solution of aluminum alkoxide in a volatile hydrocarbon solvent wherein the alkoxide radical is derived from an alkanol containing from 1 to 8 carbon atoms;

(b) adding the aluminum alkoxide solution to a mixture containing an oleaginous liquid selected from the group consisting of vegetable, mineral lubricating, and synthetic oils, an oil-soluble dispersing agent selected from the group consisting of metal alkaryl sulfonates, alkaryl sulfonic acids, oil-soluble metal soaps of carboxylic acids and carboxylic acids containing at least 8 carbon atoms, and a quantity of water in excess of that required for the hydrolysis of said aluminum alkoxide, the amount of aluminum alkoxide varying from about 1½ to 6 times that required to react with the acid where an acid is used as dispersing agent and ½ to 5 times the number of chemical equivalents of the dispersing agent where said dispersing agent is a salt of an acid;

(c) condensing from said mixture oil-insoluble aluminum hydroxide in particles the diameter of which are less than 0.25 micron by heating said mixture whereby said alkoxide is completely hydrolyzed, volatile solvents and water are removed and a uniform mixture is obtained, and that the amount of said inhibitor added to said fuel oil composition is sufficient to give an aluminum-vanadium ratio within the range of 0.5:1 to 2:1.

17. The process of preparing a stable dispersion of aluminum hydroxide in a lubricating oil composition which comprises:

(a) Admixing an aluminum alkoxide solution characterized in that the alkoxy radical of said aluminum alkoxide contains from 1 to 8 carbon atoms, the solvent is selected from the group consisting of volatile petroleum distillates, pale oil, an alkanol containing from 1 to 8 carbon atoms and corresponding to the alkoxy radical of said aluminum alkoxide, and mixtures thereof, and the aluminum content of said solution varies from 4.9 to 10.98 weight percent, with a mixture consisting of (1) an oil-soluble dispersing agent selected from the group consisting of a metal alkaryl sulfonate, an alkaryl sulfonic acid, organic phosphorus compounds, phosphorus sulfide treated olefins, carboxylic acids containing at least 8 carbon atoms and metal salts of carboxylic acids containing at least 8 carbon atoms, (2) an oleaginous liquid vehicle selected from the group consisting of mineral and synthetic lubricating oils, and (3) a quantity of water in excess, up to 2 times, of that required for the hydrolysis of said aluminum alkoxide, whereby a uniform mixture is obtained, said mixture being further characterized in that the amount of aluminum alkoxide varies from 1½ to 6 times the stoichiometric quantity when the dispersing agent is an acid and from ½ to 5 times the stoichiometric quantity when the dispersing agent is other than acid, (b) Condensing from said uniform mixture oil-insoluble aluminum hydroxide in particles, the diameters of which are less than 0.25 micron, by heating said mixture whereby said alkoxide is completely hydrolyzed and volatile solvents and excess water are removed.

18. The process of claim 17 wherein the alkoxy radical is isobutyl.

19. The process of claim 17 wherein the alkoxy radical is 2-ethyl butyl.

20. The process of claim 17 wherein the alkoxy radical is isopropyl.

21. The process of claim 17 wherein the oil-soluble dispersing agent is postdodecylbenzene sulfonic acid.

22. The process of claim 17 wherein the oil-soluble dispersing agent is a petroleum sulfonic acid.

23. The process of claim 17 wherein the oil-soluble dispersing agent is a refined tall oil.

24. The process of claim 17 wherein the oil-soluble dispersing agent is a distilled tall oil fatty acid.

25. The process of claim 17 wherein the aluminum alkoxide solution is prepared by the reaction of aluminum metal with isobutyl alcohol followed by the addition of a petroleum distillate solvent.

References Cited in the file of this patent

UNITED STATES PATENTS

| | | |
|---|---|---|
| 2,585,520 | Van Ess et al. | Feb. 12, 1952 |
| 2,671,758 | Vinograd et al. | Mar. 9, 1954 |
| 2,676,925 | Lindstrom | Apr. 27, 1954 |

FOREIGN PATENTS

| | | |
|---|---|---|
| 200,149 | Australia | Nov. 5, 1955 |
| 498,777 | Belgium | Feb. 15, 1951 |
| 761,378 | Great Britain | Nov. 14, 1956 |